Patented May 25, 1926.

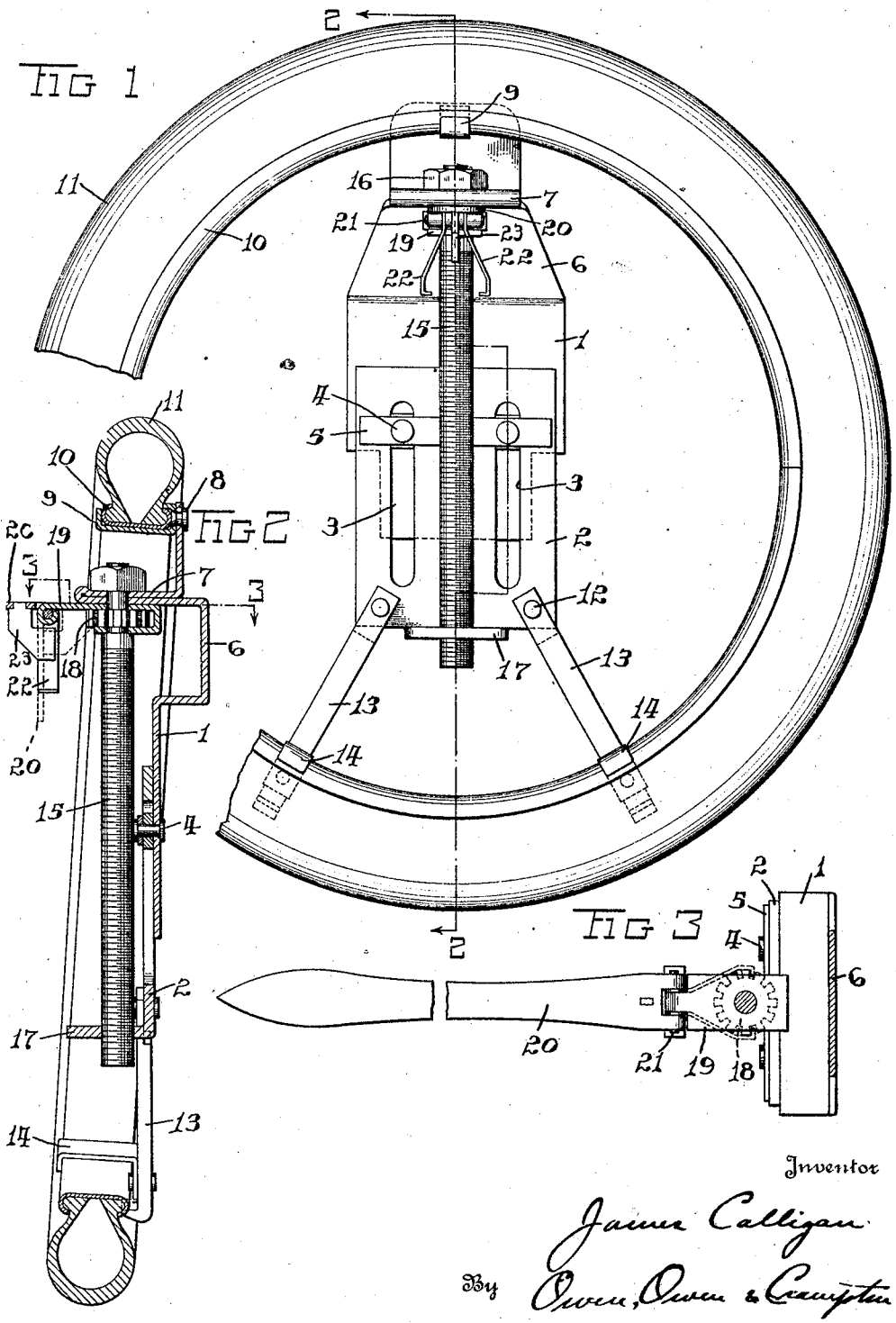

1,585,889

UNITED STATES PATENT OFFICE.

JAMES CALLIGAN, OF QUINCY, MICHIGAN.

RIM SPREADER.

Application filed September 21, 1925. Serial No. 57,502.

This invention relates to tire removing and applying devices but is more particularly concerned with tire rim spreaders for spreading the rim in the mounting of a tire thereon.

Objects of the invention are to provide a simple and improved tire rim spreader for spreading a rim with the least possible difficulty.

Further objects of the invention will hereinafter appear and the invention is shown by way of illustration in the accompanying drawings, in which,—

Fig. 1 is a side elevation of a spreader applied to a tire rim; Fig. 2 is a section on the line 2—2 of Fig. 1; and Fig. 3 is a section on the line 3—3 of Fig. 3.

The illustrated embodiment of the invention comprises a tire rim spreader having a pair of plates 1 and 2, and the plate 2 is formed with a pair of elongate slots 3 through which rivets 4 project, these rivets being fixed to the plate 1 at one end and to a strip 5 disposed above the plate 2 at the opposite end. As indicated in Fig. 2 the plate 1 is formed with a U-shaped bend 6 and one arm of the U-shaped portion is bent back upon itself as indicated at 7 to provide additional strength to the construction.

Connected as by a rivet 8 to the outer end of the plate 1 is a rim engaging hook 9 which is adapted to engage a rim 10 of a tire 11 as will readily be understood. Pivoted to the plate 2 by means of rivets 12 is a pair of arms 13 having a rim engaging jaws or hooks 14.

In order to move the plates 1 and 2 relatively to each other for spreading the rim 10, a screw threaded bolt 15 rotatable engages the portion 7 of the plate 1, being held in place by a nut 16, and the opposite end of this bolt is in threaded engagement with a lug 17, which projects at substantially right angles from the plate 2. It will be apparent that by rotating the bolt 15 in one direction the plates 1 and 2 will be drawn together and by rotating the bolt in the opposite direction the plates will be moved in a direction to separate one from the other.

In order to rotate the bolt 15 a ratchet wheel 18 is fixed to the bolt 15 and is adapted to rotate therewith. Loosely encircling the bolt 15 and ratchet wheel 18 is a U-shaped supporting element 19 to which an operating handle 20 is pivoted by means of a pin 21 and carried by the pin 21 is a pair of dogs 22 which may be of spring metal. By raising the handle 20 in approximate alignment with the support 19 one of the dogs 22 may be moved into operative relation to the ratchet wheel 18 and thereafter by moving the handle 20 back and forth the plates 1 and 2 may be moved relatively to each other.

Fixed to the handle 20 adjacent the ratchet wheel 18 is a catch 23 in the form of a plate which is disposed in a plane at right angles to the plane of the handle. The catch 23 is adapted to extend between the teeth in the ratchet wheel 18 and in this manner by locking the handle 20 in any suitable manner so that it cannot be lifted, unwarranted removal of the tire 11 is prevented when the device is used as a tire carrier. Altho the device is not shown attached to an automobile as a tire carrier, it will be readily understood that the plate or support 1 may be conveniently mounted in any desired manner.

It will be understood that the relative movement of the plates 1 and 2 will depend upon which of the dogs 22 is moved into engagement with the ratchet wheel 18. In this manner the tire rim may be readily and conveniently spread with a minimum exertion of energy and within a comparatively short period of time. After the rim has been spread and it is desired to remove the spreader it is merely necessary to swing one of the dogs out of engagement with the ratchet wheel, move the other dog into operative position and thereafter move the handle 20 back and forth until the rim is released.

While I have shown and described a construction which is the best form known to me at the present time, it is to be understood that numerous changes in details of construction, arrangement and operation may be effected without departing from the spirit of the invention especially as defined in the appended claims.

What I claim is:

1. A tire rim spreader comprising a pair of extensible plates having elements engageable with opposed portions of a tire rim, a screw rotatably mounted at one end on one of said plates, an outwardly extending flange on the other plate, said screw being in threaded engagement with said flange, a ratchet wheel fixed to one end of said screw, a U-shaped supporting element loosely encircling said screw and providing a housing for said ratchet wheel, an operating handle hingedly connected to said supporting element, and a pair of dogs associated with said handle whereby when said handle is raised to approximate alignment with the support, one of said dogs may be moved into engagement with said ratchet wheel.

2. A tire rim spreader comprising a pair of extensible plates having elements engageable with opposed portions of a tire rim, a screw rotatably mounted at one end on one of said plates, an outwardly extending flange on the other plate, said screw being in threaded engagement with said flange, a ratchet wheel fixed to one end of said screw, a U-shaped supporting element loosely encircling said screw and providing a housing for said ratchet wheel, an operating handle hingedly connected to said supporting element, a pair of dogs associated with said handle whereby when said handle is raised to approximate alignment with the support, one of said dogs may be moved into engagement with said ratchet wheel, and a catch disposed in a plane at right angles to the plane of the handle for engaging said ratchet wheel when said handle is swung against said wheel.

3. A tire rim spreader comprising a pair of opposed rim engaging elements, supporting means for each member, a screw rotatably carried by one member and in threaded engagement with the other member, a ratchet wheel fixed to said screw, means for turning said screw to move said elements relatively to each other, said means comprising a handle and a dog carried by said handle, and a catch carried by said handle, and engageable with said ratchet wheel for preventing turning thereof.

In testimony whereof I have hereunto signed my name to this specification.

JAMES CALLIGAN.